United States Patent [19]
Knoble et al.

[11] Patent Number: 6,141,234
[45] Date of Patent: *Oct. 31, 2000

[54] POWER SUPPLY WITH BATTERY CHARGER FOR EMERGENCY SIGN

[76] Inventors: David W. Knoble, 19 Old Towne Est., Tupelo, Miss. 38801; Khosrow Jamasbi, 4800 Red Bud Dr., Belden, Miss. 38826

[ * ] Notice: This patent issued on a continued prosecution application filed under 37 CFR 1.53(d), and is subject to the twenty year patent term provisions of 35 U.S.C. 154(a)(2).

[21] Appl. No.: 09/247,946

[22] Filed: Feb. 11, 1999

[51] Int. Cl.$^7$ .................................................. H02M 1/10
[52] U.S. Cl. ............................................. 363/142; 362/20
[58] Field of Search ............................... 362/20; 40/570; 363/142, 125

[56] References Cited

U.S. PATENT DOCUMENTS

| | | |
|---|---|---|
| 4,682,147 | 7/1987 | Bowman . |
| 5,446,440 | 8/1995 | Gleason et al. ........................ 340/331 |
| 5,897,194 | 4/1999 | Ham ......................................... 362/20 |

*Primary Examiner*—Shawn Riley
*Attorney, Agent, or Firm*—Hill & Simpson

[57] ABSTRACT

A power supply for an emergency light includes a battery and battery charging circuit. The battery charging circuit is formed by two diodes and two resistors and possibly a capacitor.

14 Claims, 1 Drawing Sheet

RECTIFYING BRIDGE

RECTIFYING BRIDGE

POWER SUPPLY WITH BATTERY CHARGER FOR EMERGENCY SIGN

BACKGROUND OF THE INVENTION

1. Field of the Invention

The present invention generally relates to a power supply with a battery charger and, in particular, to a power supply and a battery charger for charging a battery in an emergency display sign.

2. Description of the Related Art

Emergency signs include exit signs, warning signs and emergency lighting to provide information to people during an emergency situation, such as a power outage, a bomb threat or a fire. Since line power may be lost during such situations, the emergency sign should be provided with its own power supply in the form of a storage battery. It is imperative that the battery be maintained in a charged condition so that the display operates when needed.

Battery charging circuits for emergency signs are known from, for example, Gilbert U.S. Pat. No. 4,682,147.

SUMMARY OF THE INVENTION

The present invention provides a power supply with a charging circuit for charging a battery such as a battery used in an emergency sign. The present battery charger is provided at low cost and uses few components.

According to the invention, an emergency sign which uses, for example, light emitting diodes as a light source is operated from line power during normal operation includes a battery for powering light emitting diodes during a power outage, for example, in an emergency situation. A battery charger according to the present invention is provided which supplies rectified power to the light emitting diodes when line power is available and which supplies battery power to the light emitting diodes in the absence of line power. At the same time, the battery charging circuit supplies a charging current to the battery to maintain the battery in an optimum charged condition should the line power fail. The present charging circuit is able to perform these functions utilizing few components and so is manufactured at little cost.

DESCRIPTION OF THE PREFERRED EMBODIMENTS

Figure 1:
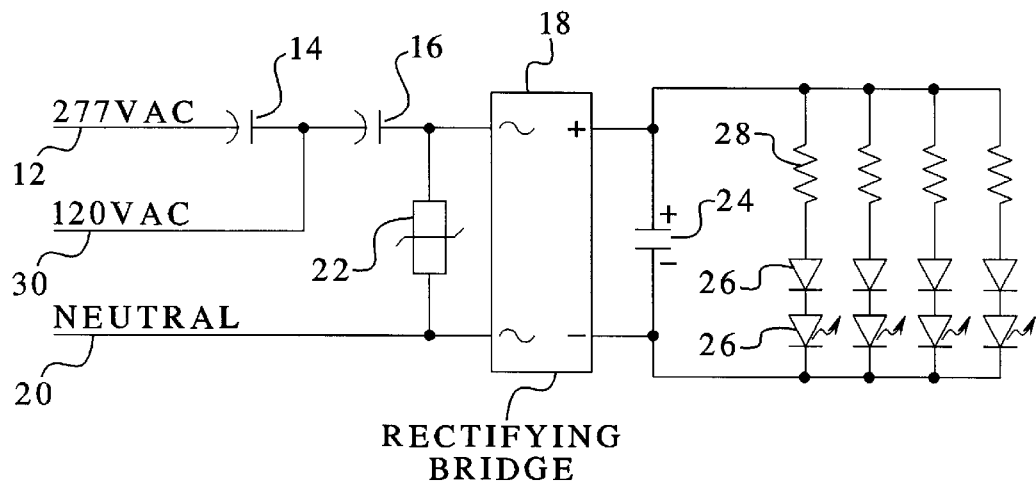
FIG. 1 is a circuit diagram of an emergency sign power supply.

Referring first to FIG. 1, an emergency sign using light emitting diodes as a light source is shown provided with a power supply circuit for AC operation from line power. The illustrated circuit is operable at either 120 volt AC or 277 volt AC by appropriate connection of the input leads. An input lead 12 for connection to 277 volt AC power is provided with a series connection of two capacitors 14 and 16 connected to one side of a rectifying bridge 18. The opposite side of the rectifying bridge 18 is connected to neutral or ground 20. A voltage limiting device, which here is a metal oxide varistor, 22 is connected between the input leads of the rectifying bridge 18. At the output of the rectifying bridge 18 is provided a storage capacitor 24. The storage capacitor 24 is not strictly necessary in every embodiment but is preferred since it reduces the likelihood of damage to the light emitting diodes upon the occurrence of a high transient voltage and also reduces the size needed for the capacitors 14 and 16.

Across the outputs of the bridge rectifier 18 and storage capacitor 24 are circuit branches each including two light emitting diodes 26 in series with a resistor 28. These light emitting diodes and resistor branches are connected in parallel to one another in as many such branches as is required for the display in the emergency sign. Four such branches with a total of eight light emitting diodes is provided in this embodiment. The resistors 28 equalize the current through the light emitting diodes 26 which might otherwise vary due to tolerance variations in the forward voltages across the diodes 26. The output of the bridge rectifier 18 is therefore essentially a constant current and the values of the resistors 28 may be kept small. The high impedance across the capacitors 14 and 16 prevent minor variations in the load from affecting the total current. In particular, branches of the light emitting diodes and resistors 10 can be added or removed and the current remains generally constant.

For 120 volt AC operation, the input lead 30 is connected to line power along with the neutral or ground lead 20 and the capacitor 14 is bypassed so that only the capacitor 16 is provided between the line input and the bridge rectifier 18.

Figure 2:
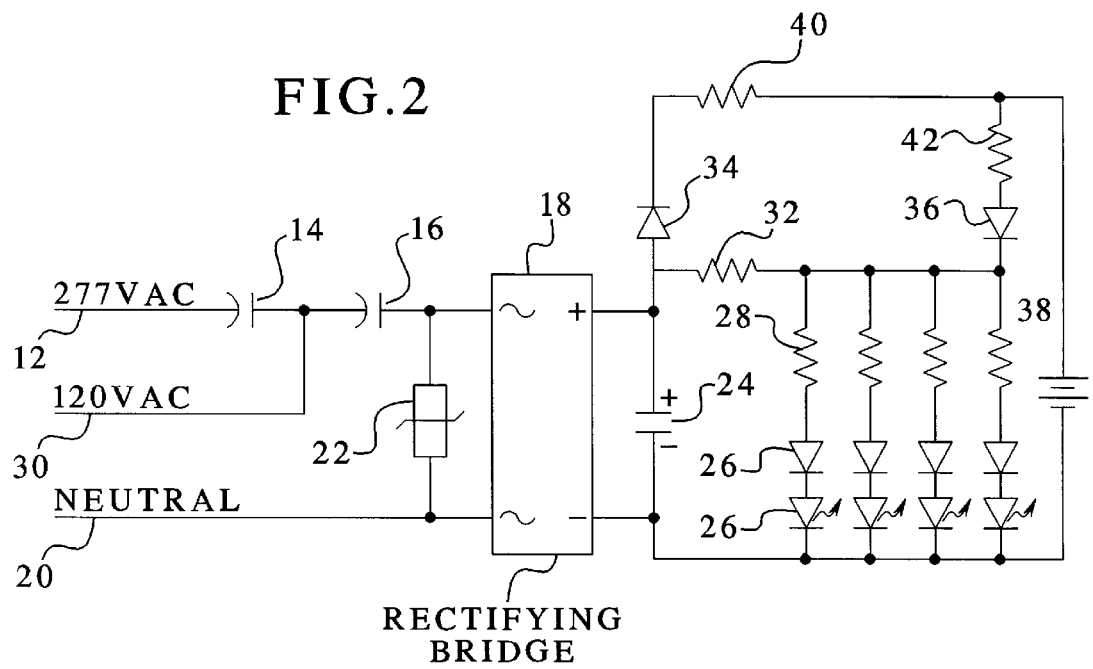
FIG. 2 is a circuit diagram of an emergency sign power supply provided with a battery charging circuit according to the present invention.

With the circuit of FIG. 1 as a basis, the improvement according to the present invention is shown in FIG. 2 including a battery and a battery charging circuit. Like components are given identical reference characters and the description of the basic circuit applies. A second resistor 32 is connected between the storage capacitor 24 and the light emitting diode branches. If the storage capacitor 24 is used on the present circuit, the diode 34 may be omitted. If the storage capacitor 24 is not used on the present circuit, the diode 34 may be required. If the diode 34 is not present, some discharge of the battery 38 will occur during portions of the line voltage cycle. The diode 34 is required if the battery would discharge through the resistor 40, and if the difference between the charging ampere-hours and the discharge ampere-hours is too small or negative. The preferred embodiment contains the capacitor 24 and omits the diode 34. The resistor 32 does not effect the current flowing through the light emitting diode branches since the current is substantially constant. However, a voltage is developed across the resistor 32 so that an anode of a diode 34 is placed on a higher voltage than a cathode of a diode 36. A battery 38 is provided as well. The battery may be a NiCad battery or a lead acid battery or a NiMH battery. Some of the current from the rectifier bridge flows through the diode 34 and through a third resistor 40 to the battery 38 to charge the battery 38. The resistance value of the resistor 40 is chosen so that the charging current is appropriate for the battery 38. The charging current is much less than the operating current of the light emitting diode branches so the affect on the current to the light emitting diodes 26 is slight. A fourth resistor 42 is provided in series with the diode 36.

If the line power fails, the voltage at the cathode of the diode 36 falls below the voltage of the battery 38. This permits current to flow from the battery 38 through the resistor 42, the diode 36, the resistors 28, and the light emitting diodes 36. The value of the resistor 42 is chosen so that the desired current flows through the light emitting diodes 26 when the line power is absent. In the preferred embodiment, the resistors 28 are chosen so that the desired current flows through the light emitting diodes 26 when line power is absent, and when the resistor 42 is omitted.

A key to choosing the values of the resistors 32 and 42 depends upon the battery 38 being used. For a 6 volt NiCad battery with a nominal 300 milliamp-hour capacity, it is recommended that the battery be charged in a range of $\frac{1}{30}$–$\frac{1}{50}$ of the nominal capacity in ampere-hours of the battery as a constant trickle charge. For a 300 milliamp-hour battery, the high end of the charging current is 10 milliamps. The resistor 32 is chosen so that the voltage at the diode 34 is sufficiently high to charge the battery to capacity under low line voltage conditions. A typical 6 volt NiCad battery has a fully charged open circuit voltage of between 6.75 and 7 volts. For typical two volt light emitting diodes, the voltage across the resistor 28 and the light emitting diodes 26 will be approximately 4.5 volts since the value of the resistor 28 is small so that approximately 0.5 volts is developed across the resistor with a nominal 30 milliamp current through the fifteen ohm light emitting diodes. The present circuit strives to achieve a voltage of 3.5 to 4 volts across the resistor of 32 during low line voltage conditions and, of course, more during nominal or high line voltage conditions. This provides a 0.6 voltage diode drop across the diode 34. The resistor 40 is chosen so that the charging current for a fully charged battery is 10 milliamps, or somewhat less for nominal line voltage conditions. It must be assured that under low line voltage conditions the battery is charged with at least 6 milliamps or $\frac{1}{50}$ of the nominal capacity in ampere-hours of the battery 38.

In the absence of line power, the battery discharges through the light emitting diodes 26. It is preferred that the battery has the capacity to power the light emitting diodes 26 for at least 90 minutes or longer. The current through the light emitting diodes 26 may be chosen to be somewhat less during battery operation than during line current AC operation to save battery life. For example, an light emitting diode current of 20 milliamps for each light emitting diode circuit, for a total of 80 milliamps, might be acceptable. This provides a nominal 3 to 3.5 hours of battery operation. Since battery capacity decreases with age, this is an acceptable value.

The present charging circuit is not limited to utilizing the filtering capacitors 14 and 16 but may include other types of AC power supplies or even an isolating voltage transformer. As indicated above, the batteries may be utilized in the present circuit, including a NiCad battery, a NiMH battery or a lead acid battery.

Thus, the present invention provides a simple battery charging circuit in a emergency display sign for the cost of only three resistors and two diodes, and possibly a storage capacitor. A simple and economical battery charging circuit is thereby provided.

Although other modifications and changes may be suggested by those skilled in the art, it is the intention of the inventors to embody within the patent warranted hereon all changes and modifications as reasonably and properly come within the scope of their contribution to the art.

We claim:

1. A power supply for an emergency sign connected to AC line power, comprising:
   a first capacitor having a first terminal connected to AC line power and a second terminal; a bridge rectifier having a first input terminal connected to a said second terminal of said first capacitor, said bridge rectifier having a second terminal connected to AC line power, said bridge rectifier having first and second outputs;
   a second capacitor connected across first and second outputs of said bridge rectifier;
   branches connected in parallel with each other, each of said branches including a plurality of light emitting diodes connected in series, said branches being connected to said second output of said bridge rectifier;
   a first resistor connected between said first output of said bridge rectifier and said branches;
   a battery having first and second battery terminals, said first battery terminal being connected to said second output of said bridge rectifier;
   a first diode-resistor branch connected between said first output of said bridge rectifier and first battery terminal, said first diode-resistor branch including a second resistor and a first diode in series, said first diode being connected at a first polarity to permit forward current flow from said first output of said bridge rectifier to first battery terminal; and
   a second diode-resistor branch connected between said branches and said first battery terminal,
   said second diode-resistor branch including a third resistor and a second diode in series, said second diode being connected at a second polarity to permit forward current flow from said first battery terminal to said branches.

2. A power supply as claimed in claim 1, wherein said branches each include an identical number of light emitting diodes.

3. A power supply as claimed in claim 2, wherein said identical number is three.

4. A power supply as claimed in claim 1, further comprising: a third capacitor connected in series with said first capacitor.

5. A power supply as claimed in claim 1, further comprising: a voltage limiting element across said first and second inputs of said bridge rectifier.

6. A power supply as claimed in claim 1, wherein said branches further include a branch resistor connected in series with said plurality of light emitting diodes in each branch.

7. A power supply for an emergency sign connected to AC line power, consisting of:
   a first capacitor having a first terminal connected to AC line power and a second terminal;
   a bridge rectifier having a first input terminal connected to a said second terminal of said first capacitor, said bridge rectifier having a second terminal connected to AC line power, said bridge rectifier having first and second outputs;
   a second capacitor connected across first and second outputs of said bridge rectifier;
   branches connected in parallel with each other, each of said branches including a plurality of light emitting diodes connected in series, said branches being connected to said second output of said bridge rectifier;
   a first resistor connected between said first output of said bridge rectifier and said branches;
   a battery having first and second battery terminals, said first battery terminal being connected to said second output of said bridge rectifier;
   a first diode-resistor branch connected between said first output of said bridge rectifier and first battery terminal, said first diode-resistor branch including a second resistor and a first diode in series, said first diode being connected at a first polarity to permit forward current flow from said first output of said bridge rectifier to first battery terminal; and a second diode-resistor branch connected between said branches and said first battery terminal, said second diode-resistor branch including a third resistor and a second diode in series, said second diode being connected at a second polarity to permit forward current flow from said first battery terminal to said branches.

8. A power supply as claimed in claim 7, wherein said branches each include branch resistor connected in series with said plurality of light emitting diodes.

9. A power supply for an emergency sign connected to AC line power, comprising:

a first capacitor having a first terminal connected to AC line power and a second terminal;

a bridge rectifier having a first input terminal connected to a said second terminal of said first capacitor, said bridge rectifier having a second terminal connected to AC line power, said bridge rectifier having first and second outputs;

a second capacitor connected across first and second outputs of said bridge rectifier; bran ches connected in parallel with each other, each of said branches including a plurality of light emitting diodes connected in series, said branches being connected to said second output of said bridge rectifier;

a first resistor connected between said first output of said bridge rectifier and said branches;

a battery having first and second battery terminals, said first battery terminal being connected to said second output of said bridge rectifier;

a first resistor branch connected between said first output of said bridge rectifier and first battery terminal, said first resistor branch including a second resistor; and a second diode-resistor branch connected between said branches and said first battery terminal, said second diode-resistor branch including a third resistor and a second diode in series, said second diode being connected at a second polarity to permit forward current flow from said first battery terminal to said branches.

10. A power supply as claimed in claim 9, wherein said branches each include a branch resistor connected in series with said plurality of light emitting diodes.

11. A power supply for an emergency sign connected to AC line power, comprising:

a first capacitor having a first terminal connected to AC line power and a second terminal;

a bridge rectifier having a first input terminal connected to a said second terminal of said first capacitor, said bridge rectifier having a second terminal connected to AC line power, said bridge rectifier having first and second outputs;

branches connected in parallel with each other, each of said branches including a plurality of light emitting diodes connected in series, said branches being connected to said second output of said bridge rectifier;

a first resistor connected between said first output of said bridge rectifier and said branches;

a battery having first and second battery terminals, said first battery terminal being connected to said second output of said bridge rectifier;

a first diode-resistor branch connected between said first output of said bridge rectifier and first battery terminal, said first diode-resistor branch including a second resistor and a first diode in series, said first diode being connected at a first polarity to permit forward current flow from said first output of said bridge rectifier to first battery terminal; and a second diode-resistor branch connected between said branches and said first battery terminal, said second diode-resistor branch including a third resistor and a second diode in series, said second diode being connected at a second polarity to permit forward current flow from said first battery terminal to said branches.

12. A power supply as claimed in claim 11, wherein said branches each include a branch resistor connected in series with said plurality of light emitting diode.

13. A power supply for an emergency sign connected to AC line power, comprising:

a first capacitor having a first terminal connected to AC line power and a second terminal;

a bridge rectifier having a first input terminal connected to a said second terminal of said first capacitor, said bridge rectifier having a second terminal connected to AC line power, said bridge rectifier having first and second outputs;

a second capacitor connected across first and second outputs of said bridge rectifier;

branches connected in parallel with each other, each of said branches including a plurality of light emitting diodes connected in series, said branches being connected to said second output of said bridge rectifier;

a first resistor connected between said first output of said bridge rectifier and said branches;

a battery having first and second battery terminals, said first battery terminal being connected to said second output of said bridge rectifier;

a first diode-resistor branch connected between said first output of said bridge rectifier and first battery terminal, said first diode-resistor branch including a second resistor and a first diode in series, said first diode being connected at a first polarity to permit forward current flow from said first output of said bridge rectifier to first battery terminal; and a second diode branch connected between said branches and said first battery terminal, said second diode branch including a second diode, said second diode being connected at a second polarity to permit forward current flow from said first battery terminal to said branches.

14. A power supply as claimed in claim 13, wherein said branches each include a branch resistor connected in series with said plurality of light emitting diodes.

* * * * *